3,453,118
METHOD FOR MAINTAINING SOFTNESS IN RAISINS

Ralph A. Jobin, Batttle Creek, Mich., assignor to Kellogg Company, Battle Creek, Mich., a corporation of Delaware
No Drawing. Filed Feb. 2, 1967, Ser. No. 613,433
Int. Cl. A23b 7/02
U.S. Cl. 99—104      8 Claims

ABSTRACT OF THE DISCLOSURE

Method for maintaining softeness in raisins by disposing soft fresh raisins of 15% moisture content, for a period of 10 seconds to 2 minutes, into a 110° F. bath which contains .5–5% by weight acidulating or alkali materials followed by washing with cool water and drying to a moisture content of 14–16%.

---

This invention relates to a novel method for maintaining softeness and flavor in raisins on storage.

More particularly, it is the object of the present invention to treat freshly processed raisins in a manner whereby the fruit product will retain its moisture, soft texture and fresh raisin flavor on storage much longer than the untreated fruit, without undergoing noticeable flavor changes and hardening in storage.

It is known that fresh raisins, even when packaged in paperboard containers and sealed therein in waxed paper and foil progressively lose their softness and flavor, possibly by a loss of moisture and/or chemical change. This is even more pronounced when the raisins are similarly packaged in admixture with dried ready-to-eat cereals, such as bran flakes which have a relatively lower initial moisture content.

Freshly processed raisins when packaged with bran flakes which have an original moisture content of 2% undergo a rapid loss of moisture to the cereal. In order to slow down this moisture equilibration, it has been necessary to use bran flakes which have a higher original moisture content (7%). However, these bran flakes lose all their crispness at this moisture level. It would be much more desirable to maintain crisp flakes and still have a raisin which will remain soft and chewable.

By treating freshly processed raisins in accordance with the process of the present invention the raisins, even though they may be dried to or below their original moisture content, say for example from an original moisture content of about 15% to a moisture content of about 14–16%, on storage they retain a desirable, readily chewable, soft inner texture much longer than untreated fruit without affecting the outer surface of the raisin. Moreover, in the preferred embodiment the process has no influence on the fresh raisin flavor.

Heretofore, attempts to obtain the aforesaid objects has been by coating the raisins with a thin line of edible oil and/or coating the raisins with sugar and/or an edible gum or starch followed by drying. While the practice of the present invention does not exclude such final coatings, they are not essential.

The end product of the present invention may be used as a cereal additive or by itself as a snack.

The process of the present invention comprises disposing freshly processed raisins, such as for example Thompson seedless raisins, at a moisture content of about 15% in an aqueous bath containing from about 0.5 to about 5.0% of an acidulating or alkalizing material heated to about 110–120° F. for a period of from about 10 seconds to about 2 minutes. The concentration of the acid or alkali solution and time of treatment are inversely related, the stronger the acid or alkali the shorter the dipping time.

The raisins are then removed from the hot bath and washed in a relatively cool water at a temperature of from about 55° F. to about 65° F. They are then dried in a warm air stream of no more than 150° F. to about the original moisture content or below, say to a moisture content of from about 14% to about 15% by weight. They are then ready to be packaged alone or with a relatively drier ready-to-eat cereal, such as for example toasted bran flakes of about 2% moisture content.

The acidic treating agent can be mineral acids such as phosphoric, hydrochloric, sulfuric, or organic acids such as citric, malic, adipic, or fumaric acid.

As a non-fully equivalent alternative, basic materials can be employed such as sodium hydroxide, potassium hydroxide or sodium bicarbonate. However, an accompanying flavor change results when basic solutions are employed.

Although it is not known what brings about the flavorable and unexpected results of the present invention, it is believed that partial hydrolysis of some of the carbohydrates in the raisins takes place.

The following are specific examples of the practice of the present invention, for the purpose of illustration.

EXAMPLE 1

Processed seedless raisins are dipped in 0.5–5% aqueous phosphoric acid solution for various lengths of time (10 sec.–2 min.) at temperatures ranging from 110° F.–120° F. Dipping 30 seconds in 2% phosphoric acid at 110° F. gives optimum results. The dipped raisins are rinsed with cold water 55–65° F. for 30 seconds and dried to 15–16% moisture by a warm (<150° F.) air stream.

Similar results were obtained using a hydrochloric acid, sulfuric acid, adipic acid or fumaric acid in place of the phosphoric acid.

EXAMPLE 2

Processed seedless raisins were dipped in 0.5–5% aqueous citric acid solution for various lengths of time (10 sec.–2 min.) at temperatures ranging from 110° F.–120° F. Optimum results are attained with a dipping time of 60 seconds at 120° F. The dipped raisins are rinsed with cold water (55–65° F.) for 30 seconds and dried to 15–16% moisture by a warm (<150° F.) air stream.

Optimum results are obtained with a dipping time of 60 seconds at 120° F. employing malic acid in place of citric acid.

EXAMPLE 3

Processed seedless raisins are dipped in 0.5–5% aqueous sodium hydroxide solution for various lengths of time (10 sec.–2 min.) at temperatures ranging from 110° F.–120° F. Optimum results are obtained with a dipping time of 30 seconds at 110° F. Longer dipping times lead to bleaching and undesirable flavors. The dipped raisins are washed for 30 seconds in cold water (55–65° F.) and dried in a warm (<150° F.) air stream to 15–16% moisture.

Similar results were obtained where potassium hydroxide is used in place of sodium hydroxide.

EXAMPLE 4

Raisins coated with 1% by weight of coconut oil are packed with dry bran flakes (2% moisture) in the ratio 20:80, raisins to bran flakes. The jars are sealed and placed in a room at 100° F. Within 14 days the raisins are considered unacceptable due to hardness.

EXAMPLE 5

Acid (phosphoric, citric) dipped raisins prepared as in Example 1 are coated as above with coconut oil and packed as above in dry bran flakes. After 42 days, the raisins were still acceptable.

Examples 4 and 5 are accelerated storage tests wherein seven days storage at 100° F. is roughly equivalent to one month storage at normal room temperature (70° F.).

I Claim:

1. A method for maintaining softness and flavor of raisins on storage which comprises disposing fresh soft raisins of approximately 15% by weight moisture content in an aqueous bath heated to approximately 110° F. and containing from about 0.5 to about 5.0% by weight of an agent selected from the group consisting of acidulating and alkali materials for a period of from about 10 seconds to about 2 minutes, removing the raisins from said bath, washing them with relatively cool water, and then drying them to a moisture content of from about 14 to about 16% by weight.

2. The method of claim 1 wherein the agent is an acidulating material.

3. The method of claim 1 wherein the acidulating material is phosphoric acid.

4. The method of claim 1 wherein the acidulating material is citric acid.

5. The method of claim 1 wherein the agent is an alkalizing material.

6. The method of claim 1 wherein the resulting dried raisins are packaged with a dry ready-to-eat cereal of relatively lower moisture content.

7. The method of claim 1 wherein the resulting dried raisins are coated with an edible oil.

8. The method of claim 1 wherein the resulting dried raisins are coated with finely granulated sugar.

References Cited

UNITED STATES PATENTS

| | | | |
|---|---|---|---|
| 119,442 | 10/1871 | Ackart | 99—104 |
| 539,258 | 5/1895 | Gibson | 99—204 |
| 1,598,883 | 12/1925 | Sackett | 99—104 |

A. LOUIS MONACELL, *Primary Examiner.*

ROGER B. ANDEWELT, *Assistant Examiner.*

U.S. Cl. X.R.

99—154, 206